Dec. 29, 1925.  1,567,487
G. W. BROCKUS
METHOD OF APPLYING COLORS TO PLASTIC COMPOSITIONS
Filed August 24, 1925
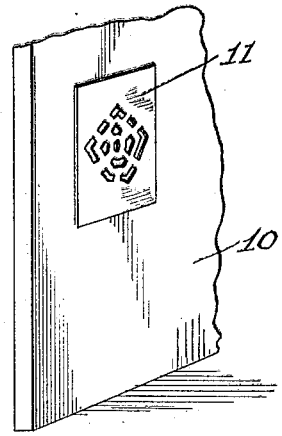
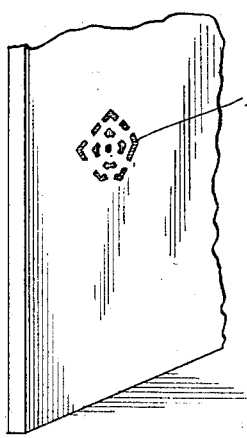
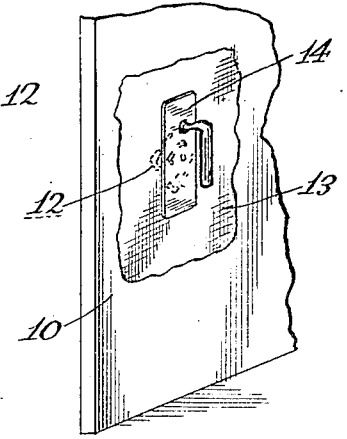
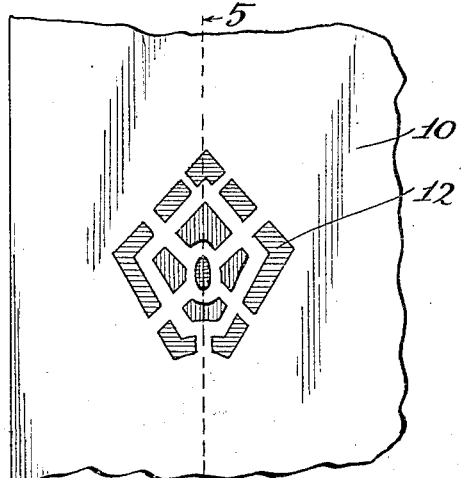
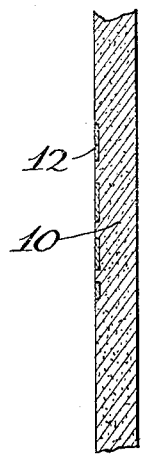
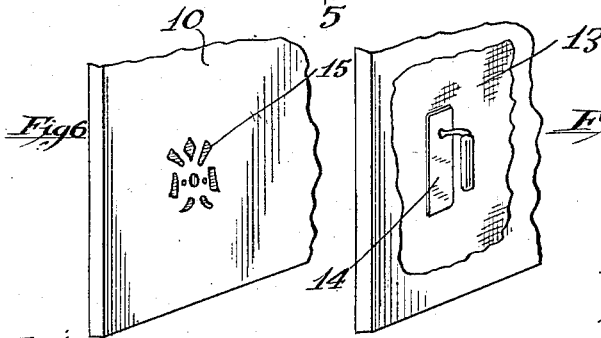
Inventor:
George W. Brockus.
By Hazard and Miller
Attorneys.

Patented Dec. 29, 1925.

1,567,487

UNITED STATES PATENT OFFICE.

GEORGE W. BROCKUS, OF ALHAMBRA, CALIFORNIA.

METHOD OF APPLYING COLORS TO PLASTIC COMPOSITIONS.

Application filed August 24, 1925. Serial No. 52,151.

*To all whom it may concern:*

Be it known that I, GEORGE W. BROCKUS, a citizen of the United States, residing at Alhambra, in the county of Los Angeles and State of California, have invented new and useful Improvements in Methods of Applying Colors to Plastic Compositions, of which the following is a specification.

This invention relates to improvements in methods for applying coloring matter or designs to self-hardening plastic compositions.

An object of the invention is to provide a method whereby coloring matter may be applied to a plastic composition and imbedded therein without causing smearing or distortion of the design.

With the foregoing and other objects in view which will be made manifest in the following detailed description and specifically pointed out in the appended claims, reference is had to the accompanying drawings for an illustrative embodiment of the invention, wherein:

Figures 1, 2 and 3 are perspective views illustrating one manner in which the coloring matter is applied, Fig. 4 is a front elevation of the composition after the coloring matter or design has been applied, Fig. 5 is a vertical section taken upon the line 5—5 of Fig. 4, Figs. 6 and 7 are perspective views illustrating another manner in which the coloring matter may be applied.

Referring to the accompanying drawings wherein similar reference characters designate similar parts throughout, the improved method may be employed in applying coloring matter or designs to walls, walks, ceilings, building tiles and similar constructions, which are formed of a self-hardening plastic material, such as plaster stucco, cement and the like. For purposes of illustration, the drawing discloses a section of a wall formed of plaster 10. The plaster is placed upon the wall, and coloring matter is applied to it before the plaster has set, or, in other words, while the plaster is still soft or "green". In Fig. 1, the coloring matter is disclosed as being applied to the wall in the form of a design by the use of a stencil 11. The coloring matter consists of a self-hardening plastic material, carrying a coloring pigment, or if the plaster 10 is colored, the material forming the design may be uncolored to form a contrast therewith. The material forming the coloring matter is formed through the apertures on the stencil 11, so that it will stick against the surface of the plaster wall 10. After the coloring composition has been applied, the stencil 11 is removed, leaving the coloring composition, indicated at 12, sticking upon the surface of the plaster wall 10, and projecting therefrom.

It will be readily understood that this coloring composition is applied in unset or soft condition, and the primary object of this invention resides in providing a method by which the projecting soft coloring composition can be worked into the body of the wall 10 without causing distortion or smearing. In order to accomplish this result, a layer of reticulated material, indicated at 13, is positioned over the coloring composition 12 on the wall 10. This reticulated material may be any suitable fabric, but I have found that cheese cloth produces the most satisfactory results. After the cheese cloth 13 has been so positioned, a trowel 14 is passed over the cheese cloth, and by a troweling action the coloring composition 12 is worked into the body of the wall 10, so that it will be flush with the exterior surface therewith. After the coloring composition has been worked into the wall, the cheese cloth 13 is removed, and the plaster wall 10 and the coloring composition 12 are allowed to harden. This forms a design upon the wall, as shown in Fig. 4, the exact shape of the design, of course, varying under various circumstances. As clearly shown in Fig. 5, the coloring matter 12 is imbedded in the wall, and because of this the improved method is advantageous in forming designs on walks or floor tiles which are apt to wear during the course of time. The wearing action on the walks or floor tiles in no way eradicates the design. Because of the fact that the trowel 14 is applied over the cheese cloth 13, the coloring matter 12 is worked into the plaster 10 without distortion or smearing, which would be occasioned if the trowel 14 were applied directly to the face of the wall.

It will be readily understood that the method is not limited to the use of a trowel for the reason that other implements might be employed for accomplishing the same purposes, as for example a roller. However, I have illustrated a trowel for the reason that plasterers and cement men conventionally use such an implement for the above described purposes.

The method is in no way limited to the use of the stencil 11, as shown in Figs. 6 and 7. The coloring matter 12 can be applied by hand with a brush or in any other desired manner, and it does not necessarily have to assume the shape of a predetermined design for the reason that in some instances, the method may be employed for producing a mottled effect on the surface of the wall, walk or building tile. Furthermore, the coloring matter may be applied so that a picture will be formed on the wall. In such instances, there is no use for the stencil 11, and after the coloring matter, indicated at 15 in Fig. 6, is applied, the cheese cloth 13 is positioned thereover and the trowel 14 worked over the cheese cloth. The advantages of the method in preventing smearing or distortion have been above set forth. Obviously, a wall or walk constructed with the above described method is a great improvement over similar constructions in which the design or coloring matter is first hardened and then imbedded in the plastic composition. Such methods are disadvantageous for the reason that the hardened sections of colored composition are very seldom flush with the surface of the wall. Some of the sections are apt to be imbedded too deep, and other sections project. It will be readily appreciated that the improved method provides a smooth, even, troweled surface, and is very attractive. As the coloring composition and plastic body harden together, a firm bond is formed between the materials, so that there is never any danger of the coloring composition chipping or dropping out.

It will be understood that various changes in the detail of construction may be made without departing from the spirit or scope of the invention as defined in the appended claims.

I claim:

1. The method of applying colorings, designs and the like to plastic compositions, which consists of placing green or unset material to the surface of the composition before it is set, positioning a layer of foraminous material thereover, troweling over the layer, and removing the layer.

2. The method of applying colorings, designs and the like to plastic compositions, which consists of placing green material carrying a coloring matter upon the surface of the unset compositions, positioning a fabric thereover, troweling over the fabric, and removing the fabric.

3. The method of applying colorings, designs and the like to plastic compositions, which consists of placing green coloring composition upon the surface of the unset composition, positioning a flexible layer of material thereover, working the coloring composition into the other composition by movably applying pressure to said layer, and removing said layer.

4. The method of applying colorings, designs and the like to plastic compositions, which consists of applying unset coloring matter to the surface of the unset composition, positioning a layer of cheese cloth thereover, troweling upon the cheese cloth, and removing the cheese cloth.

In testimony whereof I have signed my name to this specification.

G. W. BROCKUS.